US008317899B2

(12) United States Patent  
Jeffers et al.

(10) Patent No.: US 8,317,899 B2  
(45) Date of Patent: Nov. 27, 2012

(54) SHIPBOARD HYBRID SYSTEM FOR MAKING DRY, OIL-FREE, UTILITY AIR AND INERT GAS

(75) Inventors: Thomas J. Jeffers, Spring, TX (US); Marc Straub, Brentwood, CA (US)

(73) Assignee: Generon IGS, Inc., Houston, TX (US)

(*) Notice: Subject to any disclaimer, the term of this patent is extended or adjusted under 35 U.S.C. 154(b) by 288 days.

(21) Appl. No.: 12/912,886

(22) Filed: Oct. 27, 2010

(65) Prior Publication Data

US 2011/0107792 A1 May 12, 2011

Related U.S. Application Data

(60) Provisional application No. 61/259,707, filed on Nov. 10, 2009.

(51) Int. Cl.
 *B01D 53/22* (2006.01)
(52) U.S. Cl. ............. 95/45; 55/DIG. 17; 95/47; 95/117; 95/130; 95/138
(58) Field of Classification Search ............. 55/DIG. 17; 95/45, 47, 117, 130, 138
 See application file for complete search history.

(56) References Cited

U.S. PATENT DOCUMENTS

| | | | |
|---|---|---|---|
| 3,140,931 A * | 7/1964 | McRobbie | 95/106 |
| 4,237,696 A * | 12/1980 | Coblentz | 62/93 |
| 4,681,602 A * | 7/1987 | Glenn et al. | 95/47 |
| 4,900,334 A | 2/1990 | Admassu | |
| 4,931,070 A * | 6/1990 | Prasad | 95/52 |
| 4,955,993 A | 9/1990 | Sanders | |
| 5,141,530 A | 8/1992 | Jensvold | |
| 5,163,977 A | 11/1992 | Jensvold | |
| 5,259,869 A * | 11/1993 | Auvil et al. | 95/52 |
| 5,480,682 A * | 1/1996 | Kaiser et al. | 427/459 |
| 5,543,129 A | 8/1996 | Brahmbhatt | 423/351 |
| 5,588,984 A * | 12/1996 | Verini | 95/15 |
| 5,700,310 A | 12/1997 | Bowman | |
| 5,837,032 A * | 11/1998 | Moll et al. | 95/45 |
| 5,976,221 A | 11/1999 | Bowman | |
| 6,136,073 A | 10/2000 | Coan | |
| 6,913,636 B2 * | 7/2005 | Defrancesco et al. | 95/8 |
| 7,294,174 B2 | 11/2007 | Coan | |
| 7,497,894 B2 * | 3/2009 | Jeffers et al. | 95/45 |
| 7,815,711 B2 * | 10/2010 | Van Hove | 95/45 |
| 8,002,873 B2 * | 8/2011 | Wrosch et al. | 95/45 |

* cited by examiner

*Primary Examiner* — Jason M Greene  
*Assistant Examiner* — Anthony Shumate  
(74) *Attorney, Agent, or Firm* — William H. Eilberg

(57) ABSTRACT

A shipboard system provides dry, oil-free utility air and inert gas for use on a marine vessel. A compressor converts ambient air into a pressurized air stream. The air stream is cooled by heat exchange with sea water in the vicinity of the vessel. The air stream is then dried in a dehydration membrane module, and some of the product of the dehydration module is taken for use as utility air. The remainder of the dried air is passed through an air separation module which includes a polymeric membrane. The product of the air separation module includes a nitrogen-enriched gas which is used as an inert gas on the vessel. The compressor is the only mechanically moving component of the system.

17 Claims, 1 Drawing Sheet

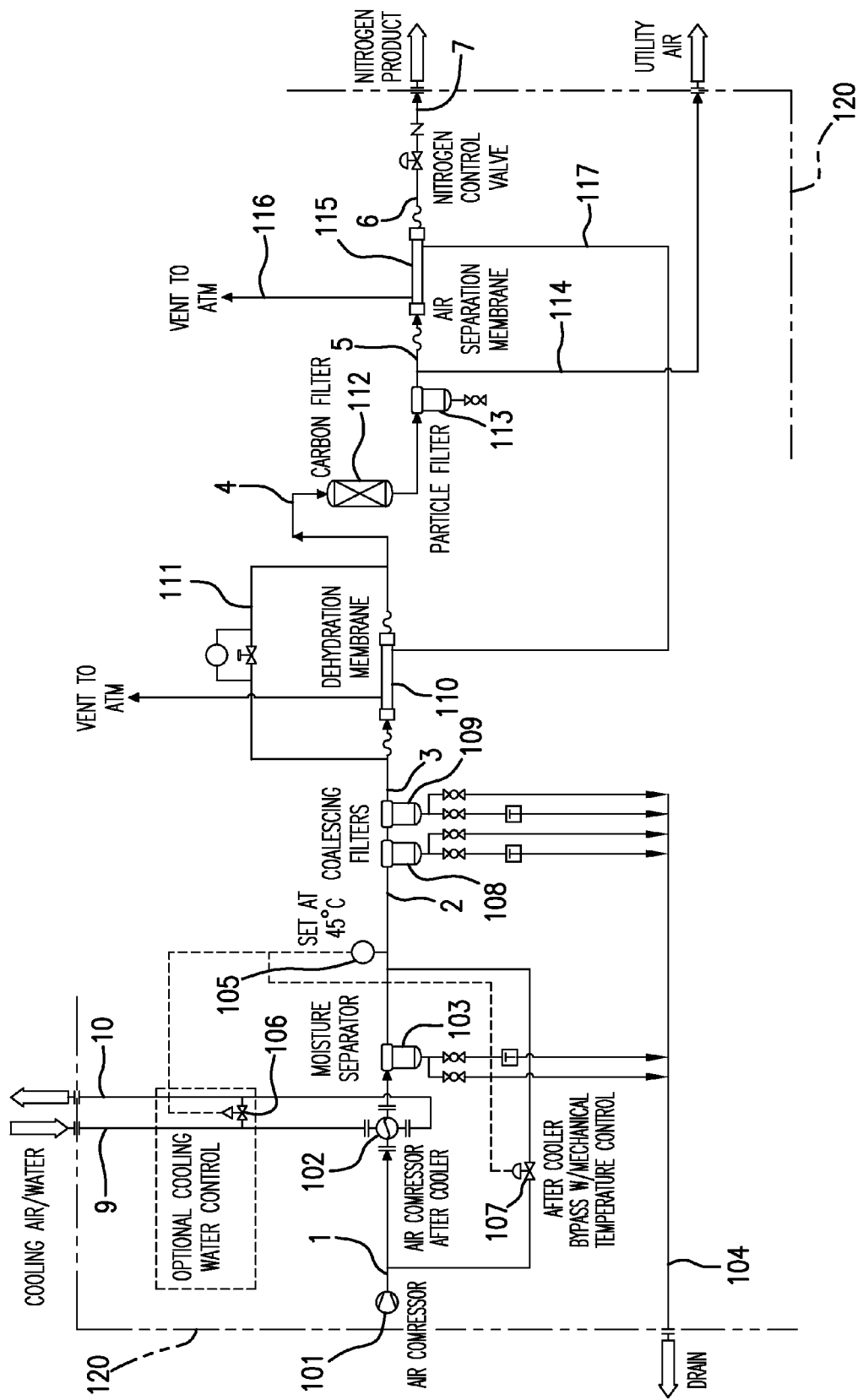

SHIPBOARD HYBRID SYSTEM FOR MAKING DRY, OIL-FREE, UTILITY AIR AND INERT GAS

CROSS-REFERENCE TO PRIOR APPLICATION

Priority is claimed from U.S. provisional patent application Ser. No. 61/259,707, filed Nov. 10, 2009, the entire disclosure of which is hereby incorporated by reference herein.

BACKGROUND OF THE INVENTION

This invention relates to marine systems, and provides an apparatus and method for making dry, oil-free utility air and inert gas, for use on a marine vessel.

Commercial ships require utility air, for various purposes, and often also require inert gas for use in a cargo storage area. Utility air must be free of liquids, such as oil or water, to avoid plugging of air lines and fouling of pneumatic instruments.

In the prior art, utility air for a ship has been typically produced by directing ambient air into a compressor, and then passing the compressed air through one or more refrigeration dryers and one or more filters.

Also in the prior art, an inerting gas has been typically produced by inert gas generators (IGGs) which use the combustion gas from the burning of diesel fuel to make a gas having a low oxygen content.

The inert gas generators of the prior art have several disadvantages. The combustion gas can be very corrosive, because it generally includes sulfuric acid and carbonic acids. Also, the amount of diesel fuel required makes the IGG relatively expensive. Furthermore, the combustion gas is a source of pollution when vented to the atmosphere.

The present invention solves the above problems by providing a system and method for making both utility air and inerting gas for use on a ship. The solution provided by the present invention is simple, efficient, and relatively non-polluting.

SUMMARY OF THE INVENTION

The present invention provides utility air, and inerting gas, for use in a marine environment, while using a relatively small amount of energy.

Ambient air is compressed in a compressor. The compressed air passes through a heat exchanger, into which sea water from outside the vessel is directed. The sea water absorbs heat from the hot compressed air, and is then returned to the outside.

The cooled compressed air is dried, first by passing it through a moisture separator and one or more coalescing filters, and by then passing it through a polymeric dehydration membrane. The dried air is further filtered, and some of the filtered and dried air is withdrawn for use as utility air on the vessel. The remaining filtered dry air passes through an air separation membrane module, which produces a nitrogen-rich stream suitable for use as an inerting gas.

The temperature of the air stream can be regulated by varying the flow of sea water through the heat exchanger, and/or by allowing some of the hot compressed air to bypass the heat exchanger.

The present invention provides utility air and inert gas, on a marine vessel, at reduced cost, compared to prior art systems. There are essentially no moving parts in the present system, except for the compressor.

The present invention therefore has the primary object of providing a marine system for making dry utility air and an inert gas.

The invention has the further object of improving the efficiency of production of utility air and inert gas for shipboard use.

The invention has the further object of reducing pollutants generated during the making of an inerting gas.

The invention has the further object of eliminating the need to burn diesel fuel for making an inerting gas on a marine vessel.

The invention has the further object of reducing the energy required for making dry utility air for use on a marine vessel.

The reader skilled in the art will recognize other objects and advantages of the present invention, from a reading of the following brief description of the drawings, and the detailed description of the invention.

BRIEF DESCRIPTION OF THE DRAWING

The FIGURE is a schematic diagram of the system of the present invention.

DETAILED DESCRIPTION OF THE INVENTION

The FIGURE shows the major components of the present invention. Ambient air enters compressor 101, and exits the compressor through conduit 1. Sea water is directed, through conduit 9, from outside the ship, into heat exchanger 102. The compressed air also enters the heat exchanger, and is therefore cooled by the sea water. The heated sea water is returned to the outside through conduit 10. Reference numeral 120 represents the boundary of the system of the present invention, with respect to outside elements.

When air is compressed, it also becomes heated. The heat exchange with the sea water offsets the heating effect of compression, and reduces the temperature of the compressed air without a substantial expenditure of energy. The sea water is always cool, compared to the temperature of the hot compressed air leaving the compressor, regardless of the location of the ship.

The cooled compressed air passes through moisture separator 103, which removes liquids from the compressed air. The moisture separator has two drains, one of which could be a manual drain, and the other of which could be an automatic drain. The exact configuration of drains may be varied, within the scope of the invention. The liquids extracted by the moisture separator are ejected through drain line 104.

Temperature controller 105 senses the temperature of the air in conduit 2, and adjusts valve 106, which regulates the flow of sea water in conduits 9 and 10. The temperature controller may also control valve 107, which allows air from the compressor to bypass the heat exchanger. The temperature of the air can thus be controlled as desired. Increasing the flow of sea water in conduit 9 will cool the air stream. Allowing some or all of the air to bypass the heat exchanger will make the air stream warmer.

The air in conduit 2 then passes through coalescing filters 108 and 109 which remove residual liquid oil from the air. The coalescing filters can be the same as those described in U.S. Pat. Nos. 5,700,310 and 5,976,221, the disclosures of which are incorporated by reference herein.

The air flowing through conduit 3 then enters module 110 which contains a dehydration membrane. The dehydration membrane may be the same as described in U.S. Pat. No. 7,294,174, the disclosure of which is also incorporated by reference herein. The dehydration membrane removes water vapor from the air. A bypass path 111 is provided to allow the system to bypass the dehydration membrane in an emergency, such as in the event that the module fails, or for other reasons.

The air leaving the dehydration module flows through conduit 4 into carbon filter 112, and then through particle filter 113. The carbon filter reduces the amount of oil vapor in the stream to levels of the order of parts per billion. Some of the air leaving the particle filter, in conduit 5, is directed through conduit 114, and is used as utility air on the vessel. That is, conduit 114 provides one of the product streams of the present invention.

The remainder of the air leaving the particle filter is directed into air separation module 115. Module 115 contains a polymeric membrane capable of separating air into components, and is therefore a non-cryogenic means for air separation. Such membranes are well known in the art. Examples of polymeric membranes for air separation are given in U.S. Pat. Nos. 4,900,334, 4,955,993, 5,141,530, 5,163,977, and 6,136,073, the disclosures of all of which are incorporated by reference herein.

The products of the air separation module include a permeate gas and a non-permeate gas. One of these will be nitrogen-enriched, and the other will be oxygen-enriched, depending on the type of membrane used. In the present invention, the gas flowing in conduit 7 is the nitrogen-enriched gas, and the waste gas is the oxygen-enriched gas. The gas flowing in conduit 7 is therefore the other product gas of the present invention. The waste gas is vented to the atmosphere, through conduit 116. Some of the product gas can also be used as a sweep gas, flowing in conduit 117, for use in the dehydration module 110.

The gas produced by module 115 is nitrogen-enriched, and flows out of the module through conduit 6, then flows through an appropriate control valve and/or check valve, and then flows into conduit 7, where it is directed to the application requiring an inert gas.

An important feature of the present invention is the use of a single compressor which is common to the production of both the utility air and the inert gas.

Another important feature of the present invention is the use of sea water in a heat exchanger to cool and control the temperature of the compressed air, which has become heated due to compression. Cooling of the compressed air is advantageous because it allows one to remove condensate water from the air at a relatively low temperature. Also, the gas directed into the dehydration module is relatively cool, thereby prolonging the life of the module. The air dehydration module avoids further condensation of water vapor as the air cools.

The use of a compressor in the system and method of the present invention is advantageous when compared to the inert gas generators of the prior art. It turns out that the amount of fuel required to operate the compressor is about 15-30% less than the fuel that would be burned in a conventional IGG to produce an inert gas. The exact saving depends on the level of oxygen required in the inert gas (such oxygen level may be in the range of about 1-5% for typical applications).

The use of the sea water for cooling, instead of a conventional air/air heat exchanger, makes it possible to provide a compact heat exchanger to control the compressed air temperature, at temperatures lower than ambient, for conditions of extreme ambient temperatures that may limit the use of the downstream filtration and/or membrane equipment.

The energy cost is further minimized by the use of the waste vent stream, from the air separation module, as a sweep stream for the dehydration module. Normally, one would use the product gas from the dehydration module as its own sweep stream. Using the waste gas from the separation module as the sweep gas for the dehydration module avoids the need for a refrigeration dryer which requires energy and significantly more maintenance than is required by a membrane dryer. The latter consideration is important in remote shipboard applications.

The present invention has the advantage that it does not require an electrical heater for drying the air. Thus, the amount of energy is reduced, and problems due to ground-fault issues are eliminated. Eliminating the need for an electrical heater reduces the cost of the installation, not only due to the absence of the heater, but also because it is no longer necessary to provide a heater panel and temperature controllers.

Because the system of the present invention has only one continuously moving part (i.e. the compressor), the maintenance requirements are greatly reduced, as compared to prior art systems. Moreover, because of the reduction of temperature of the compressed air, due to the heat exchanger, the air supplied to the membrane modules is at the minimum allowable temperature, which maximizes the life and efficiency of the modules. By maximizing membrane efficiency, one improves the overall energy efficiency of the system. And by minimizing the temperature of the air supplied to the modules, the module life is prolonged, further reducing the overall cost of the system.

As explained above, even after allowing for the fuel needed to drive the compressor, the system of the present invention generates up to 25% less polluting materials as compared to inert gas generators of the prior art.

The invention can be modified in various ways. The exact configuration and number of the moisture separators can be changed. The composition of the dehydration membrane, and of the air separation membrane, can be varied. These and other modifications, which will be apparent to those skilled in the art, should be considered within the spirit and scope of the following claims.

What is claimed is:

1. A system for providing dry, oil-free utility air and inert gas for use on a marine vessel, comprising:
   a) a compressor adapted to receive ambient air and to create a stream of pressurized air,
   b) means for conveying sea water from an environment of a marine vessel, and for bringing the sea water into heat exchange with said stream of pressurized air,
   c) means for drying said stream of pressurized air, wherein the drying means includes an outlet end, the system further comprising a conduit for conveying some dried air from said outlet end, wherein said conduit delivers a product stream of utility air for use on the vessel, and
   d) an air separation module comprising a polymeric membrane, the air separation module being connected to receive dried air from the drying means, wherein the air separation module has an output comprising a nitrogen-enriched stream which comprises a product inert gas.

2. The system of claim 1, wherein the compressor comprises a sole moving component of the system.

3. The system of claim 2, wherein the drying means includes a dehydration membrane.

4. The system of claim 3, further comprising at least one filter for removing liquid from a gas stream, the filter being connected upstream of the dehydration membrane.

5. The system of claim 3, wherein the air separation module generates a waste stream, and wherein the waste stream is connected to the dehydration module for use as a sweep stream for the dehydration module.

6. The system of claim 1, further comprising means for sensing a temperature of the pressurized air stream, and a valve, controlled by the sensing means, for varying a flow of said sea water, so as to control a temperature of the pressurized air stream.

7. In combination, a marine vessel and a system for providing dry, oil-free utility air and inert gas for use on said marine vessel, comprising:
    a) a compressor for converting ambient air into a stream of pressurized air,
    b) means for conveying sea water from a vicinity of said marine vessel, and for bringing the sea water into heat exchange with said stream of pressurized air,
    c) means for drying said stream of pressurized air, wherein the drying means includes an outlet end, the system further comprising a conduit for conveying some dried air from said outlet end, wherein said conduit delivers a product stream of utility air for use on the vessel, and
    d) an air separation module comprising a polymeric membrane, the air separation module being connected to receive dried air from the drying means, wherein the air separation module has an output comprising a nitrogen-enriched stream which comprises a product inert gas.

8. The combination of claim 7, wherein the drying means includes a dehydration membrane.

9. The combination of claim 8, further comprising at least one filter for removing liquid from a gas stream, the filter being connected upstream of the dehydration membrane.

10. The combination of claim 8, wherein the air separation module generates a waste stream, and wherein the waste stream is connected to the dehydration module for use as a sweep stream for the dehydration module.

11. The system of claim 7, further comprising means for sensing a temperature of the pressurized air stream, and a valve, controlled by the sensing means, for varying a flow of said sea water, so as to control a temperature of the pressurized air stream.

12. A method for providing dry, oil-free utility air and inert gas for use on a marine vessel, comprising:
    a) compressing ambient air to form a stream of pressurized air,
    b) cooling said stream of pressurized air by heat exchange with sea water obtained from a vicinity of the vessel,
    c) drying said stream of pressurized air, and using some of the dried stream as utility air for the vessel, and
    d) non-cryogenically separating some of said stream of pressurized air into components, wherein one of the components comprises a nitrogen-enriched stream, and using said nitrogen-enriched stream as a product inert gas on the vessel.

13. The method of claim 12, wherein step (a) is the only step which is performed with a mechanically moving component.

14. The method of claim 12, wherein step (c) comprises passing said stream through a dehydration membrane module.

15. The method of claim 14, wherein step (c) is preceded by passing said stream through at least one filter for removing liquid from the stream.

16. The method of claim 14, wherein step (d) comprises passing the stream through an air-separation module, wherein the air separation module generates a waste stream, and wherein the method further comprises conveying said waste stream to the dehydration membrane module for use as a sweep stream for the dehydration module.

17. The method of claim 12, further comprising sensing a temperature of the pressurized air stream, and varying a flow of said sea water, in response to sensed temperature of the air stream, so as to control a temperature of said pressurized air stream.

* * * * *